US006584602B2

(12) United States Patent
Ko

(10) Patent No.: US 6,584,602 B2
(45) Date of Patent: Jun. 24, 2003

(54) PARALLELISM AND CROSSTALK CHECK ON A PRINTED CIRCUIT BOARD (PCB)

(75) Inventor: Kevin W. Ko, MountainView, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 167 days.

(21) Appl. No.: 09/780,246

(22) Filed: Feb. 9, 2001

(65) Prior Publication Data

US 2002/0140436 A1 Oct. 3, 2002

(51) Int. Cl.[7] .............................................. G06F 17/50
(52) U.S. Cl. .................................... 716/4; 716/5; 716/6
(58) Field of Search ....................................... 716/1–18

(56) References Cited

U.S. PATENT DOCUMENTS

| 4,646,436 | A | * | 3/1987 | Crowell et al. ............... 29/850 |
|---|---|---|---|---|
| 5,638,402 | A | * | 6/1997 | Osaka et al. ................. 375/257 |
| 5,805,030 | A | * | 9/1998 | Dhuey et al. .................... 333/1 |
| 6,018,623 | A | * | 1/2000 | Chang et al. ............ 395/500.07 |
| 6,028,989 | A | * | 2/2000 | Dansky et al. .......... 395/500.09 |
| 6,445,204 | B1 | * | 9/2002 | He et al. ...................... 324/763 |
| 2002/0066589 | A1 | * | 6/2002 | Lin ............................. 174/113 |

* cited by examiner

Primary Examiner—Vuthe Siek
(74) Attorney, Agent, or Firm—Meyertons Hood Kivlin Kowert & Goetzel, P.C.; B. Noël Kivlin

(57) ABSTRACT

A method is provided, the method comprising associating each net of traces in a list of nets of the traces on a routed PCB with a parallelism index value and sorting the list of the nets of the traces on the routed PCB based on the parallelism index values. The method also comprises providing a list of victim nets of traces on the routed PCB based on the parallelism index values, each of the victim nets on the list of the victim nets associated with at least one offending net of traces on the routed PCB.

30 Claims, 8 Drawing Sheets

PARALLELISM AND CROSSTALK CHECK ON A PRINTED CIRCUIT BOARD (PCB)

BACKGROUND OF THE INVENTION

1. Field of the Invention

This invention relates generally to computer hardware and software and, more particularly, to a method for testing signal integrity on a printed circuit board (PCB) design.

2. Description of the Related Art

There is a constant drive within the computer industry to reduce signal integrity problems on printed circuit boards (PCBs). In particular, there is often a need to reduce signal integrity problems associated with parallelism or crosstalk in the design of PCBs. Parallelism or crosstalk involves the long parallel runs of traces interconnecting elements on the PCBs. The long parallel runs of traces may couple electrical noise onto one another. Often, after a PCB has been routed, the board designer has no easy way to verify that board has been routed according to the specified parallelism guidelines.

Conventionally, the board designer may eyeball the nets of traces one layer at a time. However, even if there is a way manually to identify the problem nets of traces, there is a very limited capability to quantify the severity of the problem. Without a method to quantify the severity of the parallelism problem, given that thousands of traces may be present in a device, the board designer may not know where to begin to fix the problem nets of traces.

The present invention is directed to overcoming, or at least reducing the effects of, one or more of the problems set forth above.

SUMMARY OF THE INVENTION

In one aspect of the present invention, a method is provided, the method comprising associating each net of traces in a list of nets of the traces on a routed PCB with a parallelism index value and sorting the list of the nets of the traces on the routed PCB based on the parallelism index values. The method also comprises providing a list of victim nets of traces on the routed PCB based on the parallelism index values, each of the victim nets on the list of the victim nets associated with at least one offending net of traces on the routed PCB.

In another aspect of the present invention, a system is provided, the system comprising a representation of a routed PCB having a plurality of nets of traces thereon and a list of nets of the traces on the representation of the routed PCB with a parallelism index value associated with each net of the traces in the list of the nets of the traces on the representation of the routed PCB, the list of the nets of the traces on the representation of the routed PCB sorted based on the parallelism index values. The system also comprises a list of victim nets of traces on the representation of the routed PCB provided based on the parallelism index values, each of the victim nets on the list of the victim nets associated with at least one offending net of traces on the representation of the routed PCB.

In yet another aspect of the present invention, a device is provided, the device comprising means for associating each net of traces in a list of nets of the traces on a routed PCB with a parallelism index value and means for sorting the list of the nets of the traces on the routed PCB based on the parallelism index values. The device also comprises means for providing a list of victim nets of traces on the routed PCB based on the parallelism index values, each of the victim nets on the list of the victim nets associated with at least one offending net of traces on the routed PCB.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
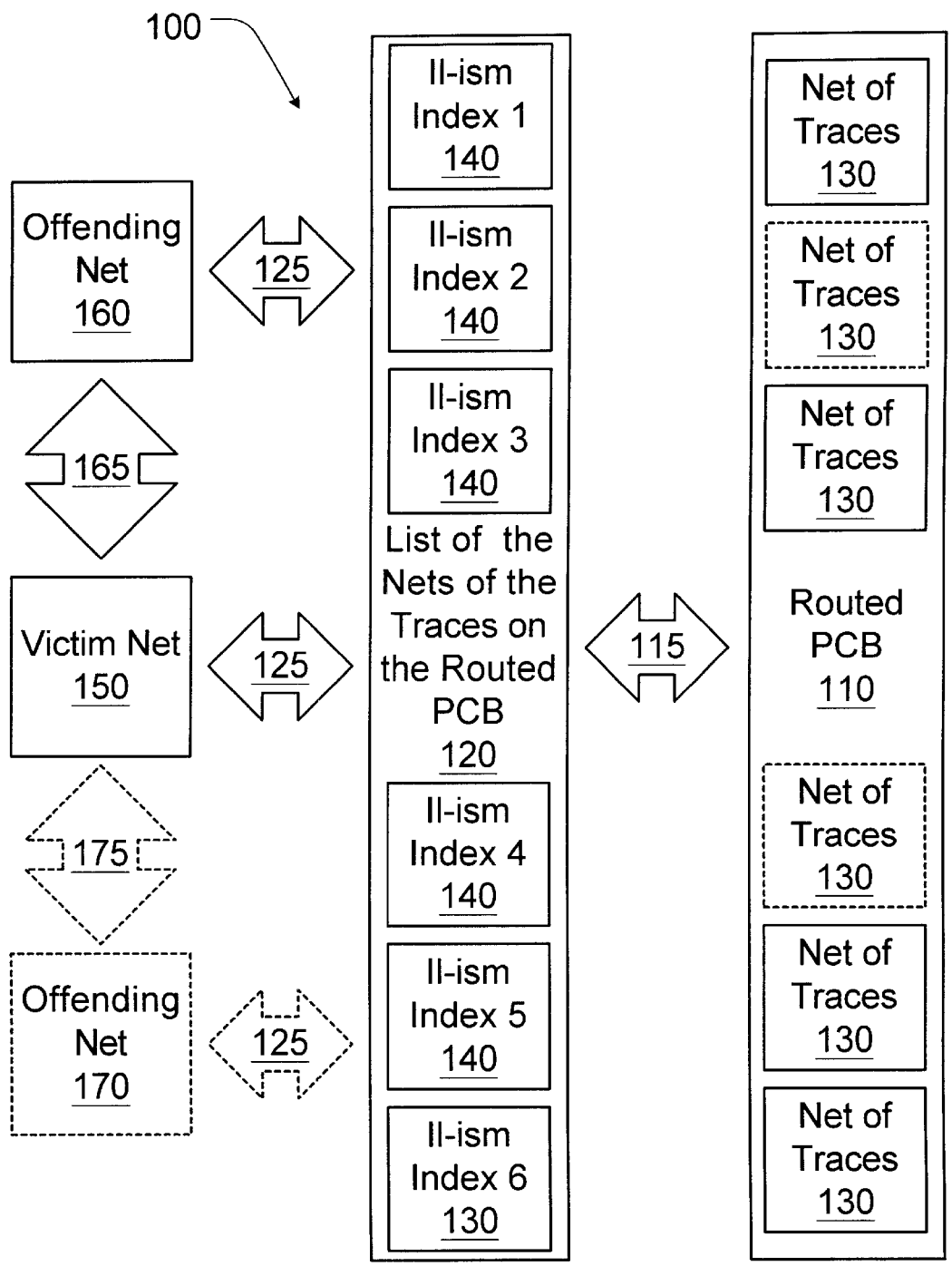
FIGS. 1–3 schematically illustrate various embodiments of a device and a system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
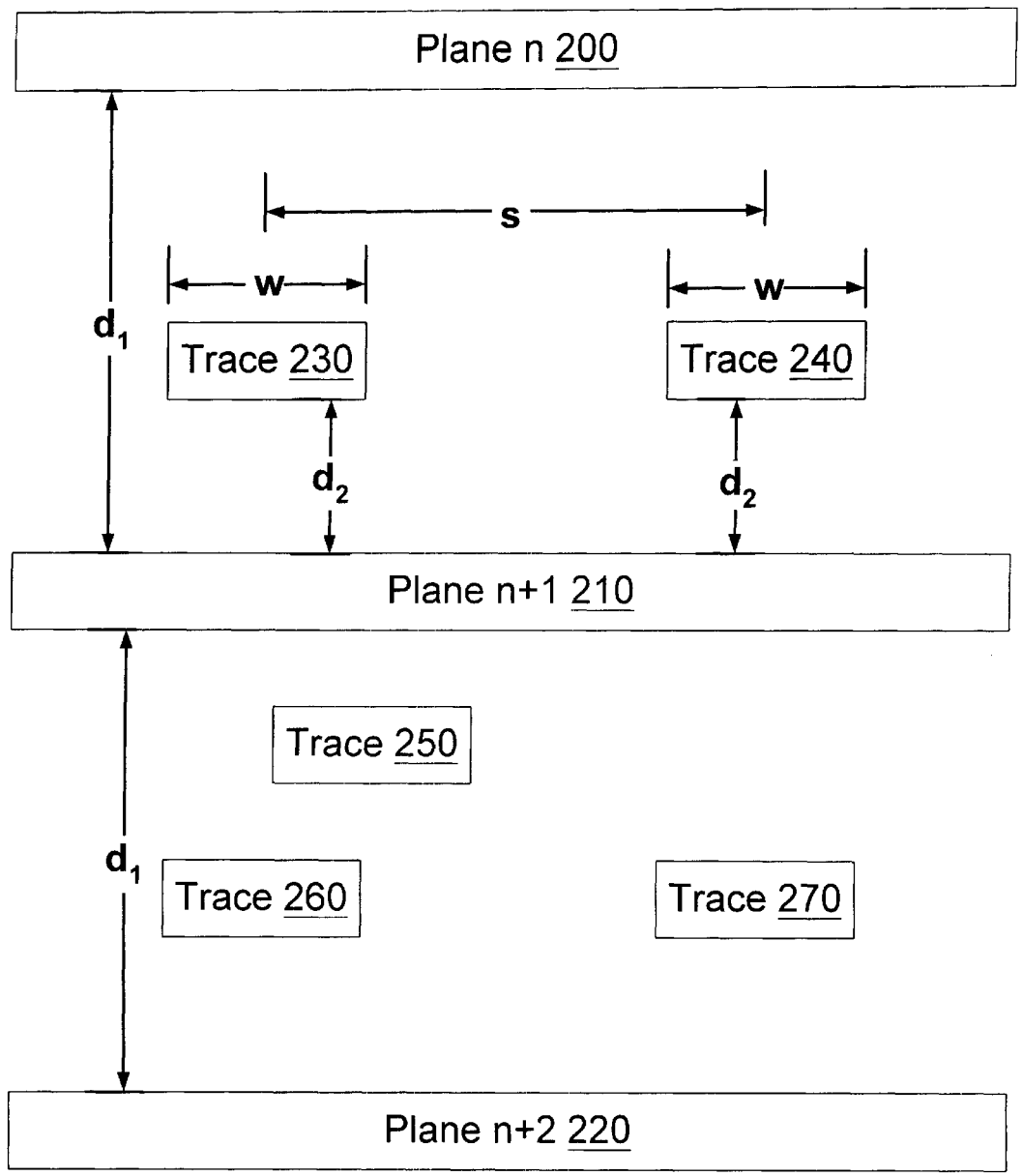

Illustrative embodiments of a method and device according to the present invention are shown in FIGS. 1–8. As shown in FIG. 1, a system 100 may comprise a routed PCB 110 having a plurality of nets of traces 130 thereon, a list 120 of the nets of the traces 130 and a list of victim nets of the traces 150. The plurality of the nets of the traces 130 on the routed PCB 110 may include nets of traces 130 (shown in phantom) that are disposed at a different level on the routed PCB 110 than other nets of traces 130. For example, as shown in FIG. 2, traces 230 and 240 are disposed between plane n 200 and plane n+1 210 whereas traces 250, 260 and 270 are disposed between plane n+1 210 and plane n+2 220, where the value of n may range from 1 to any finite number. Similarly, trace 250 is disposed at a different level than traces 260 and 270 even between plane n+1 210 and plane n+2 220.

The list of the victim nets of the traces 150 may be associated with at least one offending net of traces 160 (as indicated by arrow 165). The list of the victim nets of the traces 150 may also be associated with another offending net of traces 170 (shown in phantom and as indicated by arrow 175, also shown in phantom).

The list 120 of the net of the traces 130 on the routed PCB 110 may have a parallelism index (∥-ism index) i 140 value (where i may range from 1 to the number of nets of traces 130) associated with each net of the traces 130 on the routed PCB 110. The list 120 of the net of the traces 130 on the routed PCB 110 may be sorted based on the parallelism index (||-ism index) i 140 values. The list of the victim nets of the traces 150 may be provided based on the parallelism index (||-ism index) i 140 values from the list 120 of the net of the traces 130 on the routed PCB 110 (as indicated by arrow 125). Similarly, the list(s) of the offending nets of the traces 160 and/or 170 may be provided based on the parallelism index (||-ism index) i 140 values from the list 120 of the net of the traces 130 on the routed PCB 110 (as indicated by arrows 125, the one connecting to the offending nets of the traces 170 shown in phantom). The list 120 of the net of the traces 130 on the routed PCB 110 may be derived by an analysis of the routed PCB 110 (as indicated by arrow 115).

For example, Innoveda Inc.'s XTK® toolkit (QuadDesign TLC) may be used to extract values from Cadence Inc.'s Allegros board (.brd) file. The XTK® toolkit has the advantage that XTK® captures both same-layer parallelism between traces (such as between either traces 230 and 240 or traces 260 and 270) and broadside parallelism between traces (such as between either traces 250 and 260 or traces 250 and 270). The XTK® toolkit also captures same-layer parallelism between nets of traces at substantially the same level of the routed PCB 110 and/or between nets of traces at different levels of the routed PCB 110. In addition, the XTK® toolkit has the advantage that XTK® output files are text (.txt) format and, consequently, readable by most tools. The XTK® toolkit also has an XNS® simulator inside the toolkit that is able to perform post-routing timing simulations.

Figure 3:
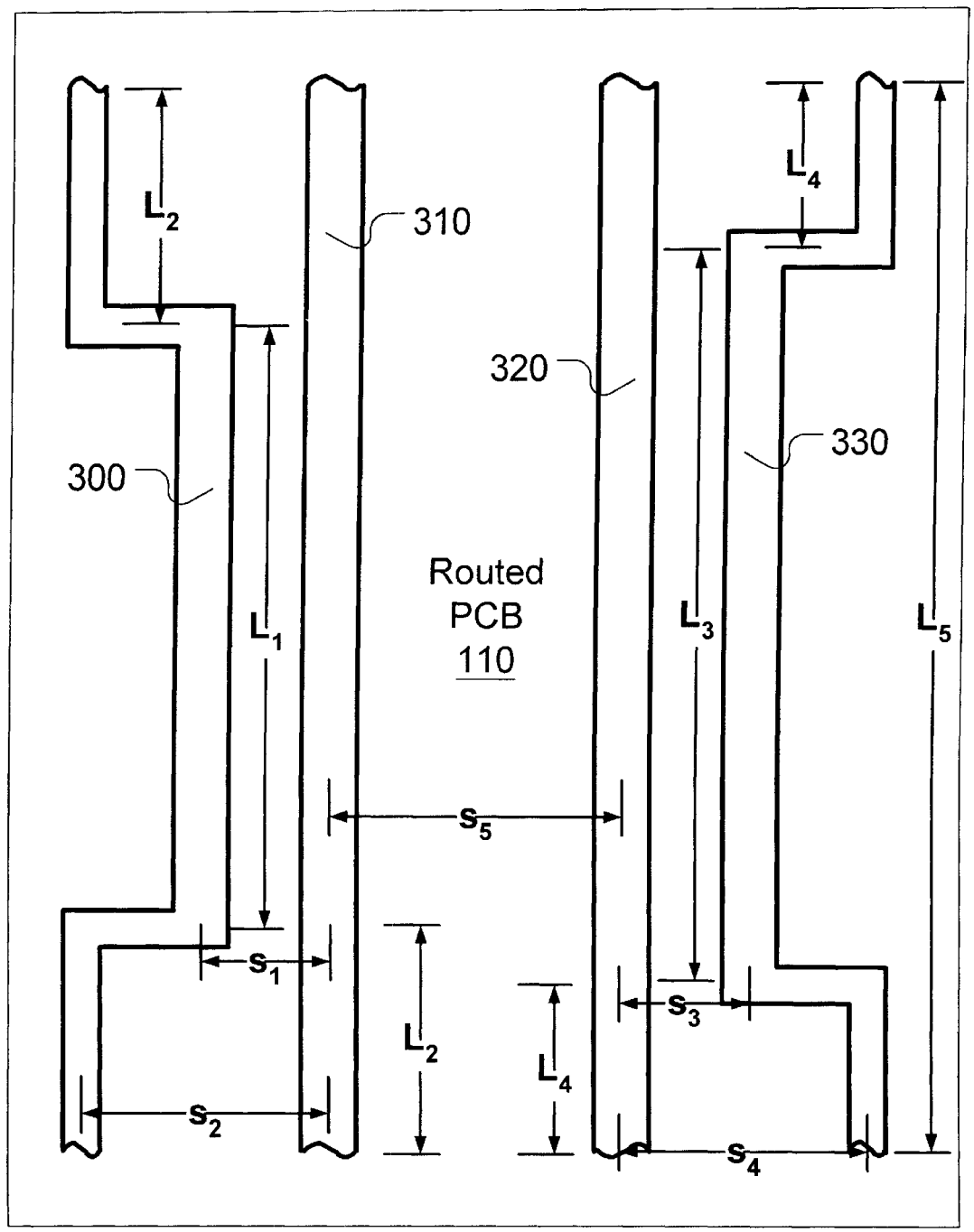

The XTK® toolkit may scan for parallel nets of the traces 130 given a spacing of 1-mil (0.00254 cm), to capture direct broadside parallel nets of the traces 130. As shown in FIG. 3, the spacings $s_1$, and $s_2$ between traces 300 and 310, and the spacings $s_3$ and $s_4$ between traces 320 and 330, may be measured from substantially the center of the relevant portion of one trace to substantially the center of the relevant portion of another trace. Similarly, the parallel lengths $L_1$ and $L_2$ between respective relevant portions of the traces 300 and 310, and the parallel lengths $L_3$ and $L_4$ between respective relevant portions of the traces 320 and 330, may be measured as shown in FIG. 3. The traces 310 and 320 may be separated by a spacing $s_5$ and may have a parallel length $L_5$.

The XTK® toolkit may then find all parallel nets of the traces 130 identified by XTK® to be problem nets of traces, either victim nets of the traces 150 and/or offending nets of the traces 160 and 170, facing a parallelism problem with a varying degree of severity that may correspond to the respective parallelism index (||-ism index) i 140 value. For example, one set of the problem nets of the traces may correspond to the victim nets of the traces 150 being victimized by one or more of the offending nets of the traces 160 and/or 170.

The XTK® toolkit may then reset the spacing to 2-mil (0.00508 cm) and repeat the actions described above when the spacing is set to 1-mil (0.00254 cm). The XTK® toolkit may then reset the spacing to 3-mil (0.00762 cm) and repeat the actions described above when the spacing is set to 1-mil (0.00254 cm). The XTK® toolkit may repeatedly reset the spacing by 1-mil (0.00254 cm) increments, until a predetermined spacing limit (for example, 20-mil or 0.0508 cm) is reached, depending on the run time requirements.

After all the parallelism nets of the traces 130 are completed and/or compiled according to the incremental 1-mil (0.00254 cm) spacings, the following condition may be imposed: The problem or violation nets of the traces 130 for the 1-mil (0.00254 cm) spacing iteration will be a subset of the problem or violation nets of the traces 130 for the 2-mil (0.00508 cm) spacing iteration, the problem or violation nets of the traces 130 for the 2-mil (0.00508 cm) spacing iteration will be a subset of the problem or violation nets of the traces 130 for the 3-mil (0.00762 cm) spacing iteration, and so forth. By performing a "diff" function or operation through the resulting script, it can be found exactly when the nets of the traces 130 have 1-mil (0.00254 cm), 2-mil (0.00508 cm), 3-mil (0.00762 cm) spacings and so forth. This is one way to get this piece of the information with the XTK® toolkit.

A final script may apply appropriate weightings (due to the respective spacings), scalings (due to the respective relative voltage swings) and saturation cutoff (due to the crosstalk saturation effect) to the effective parallelism lengths. The effective parallelism lengths for a given victim net of the traces 150 may then be summed up, arriving at a "worst-case" parallelism length for the given victim net of the traces 150. The statistical "worst-case" parallelism length for a given victim net of the traces 150 may be derived by taking the square root of the sum of the squares of all the effective parallelism lengths for the given victim net of the traces 150. In this way, the final list of the problem or violation nets the traces 130 may be determined.

FIGS. 4–8 schematically illustrate particular embodiments of respective methods 400–800 practiced in accordance with the present invention. FIGS. 1–3 schematically illustrate various devices and systems with which the methods 400–800 may be practiced. For the sake of clarity, and to further an understanding of the invention, the methods 400–800 shall be disclosed in the context of the various devices and systems shown in FIGS. 1–3. However, the present invention is not so limited and admits wide variation, as is discussed further below.

Figure 4:
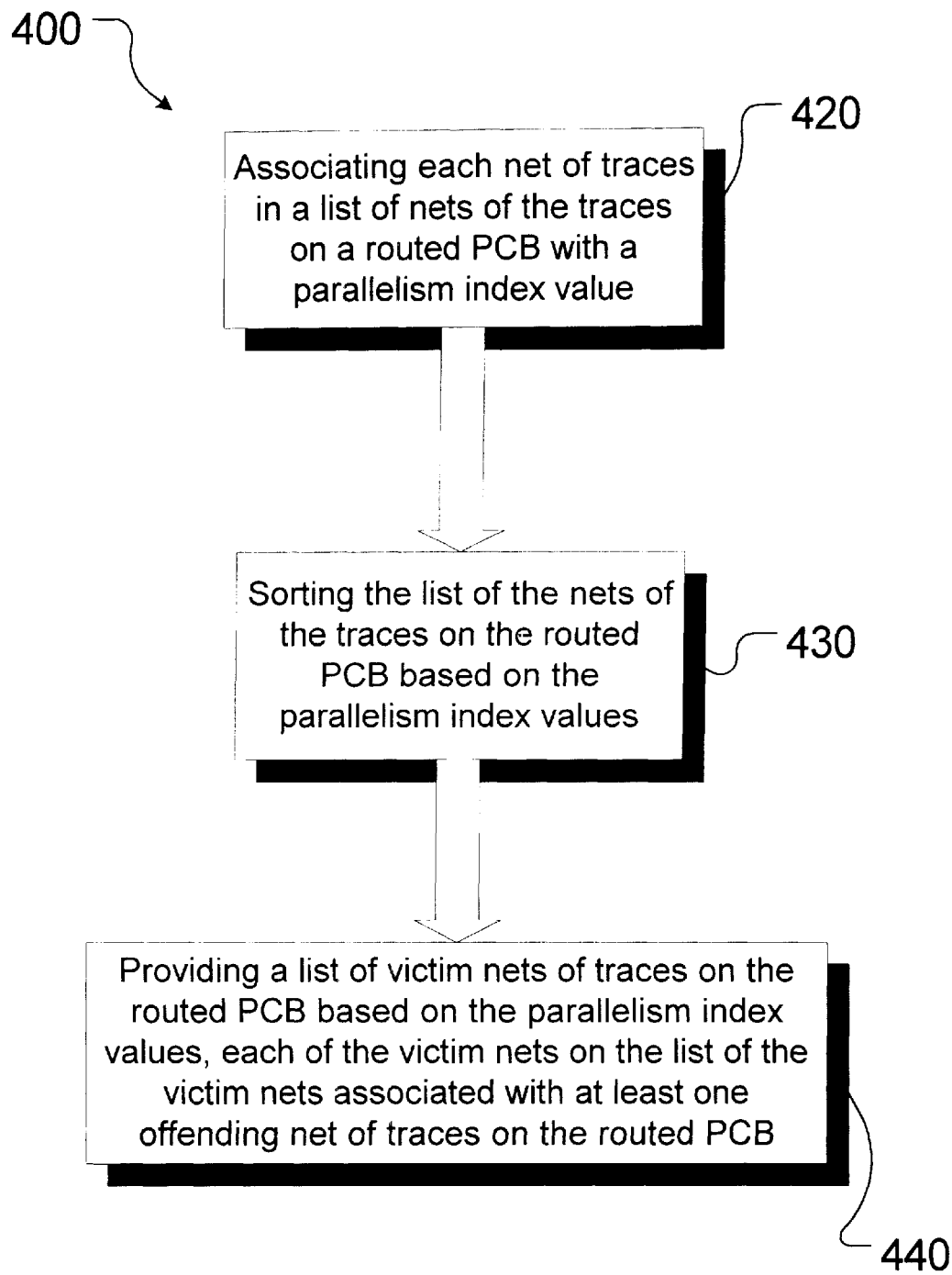
FIGS. 4–8 schematically illustrate various embodiments of a method practiced in accordance with the present invention.

As shown in FIG. 4, the method 400 begins, as set forth in box 420, by associating each net of the traces 130 in the list 120 of the nets of the traces 130 on the routed PCB 110 with a parallelism index (||-ism index) i 140 value. The method 400 proceeds, as set forth in box 430, by sorting the list 120 of the nets of the traces 130 on the routed PCB 110 based on the parallelism index (||-ism index) i 140 values. The method 400 then proceeds, as set forth in box 440, by providing the list of the victim nets of the traces 150 on the routed PCB 110 based on the parallelism index (||-ism index) i 140 values. Each of the victim nets on the list of the victim nets of the traces 150 is associated with at least one offending net of traces 160 and/or 170 on the routed PCB 110.

Figure 5:
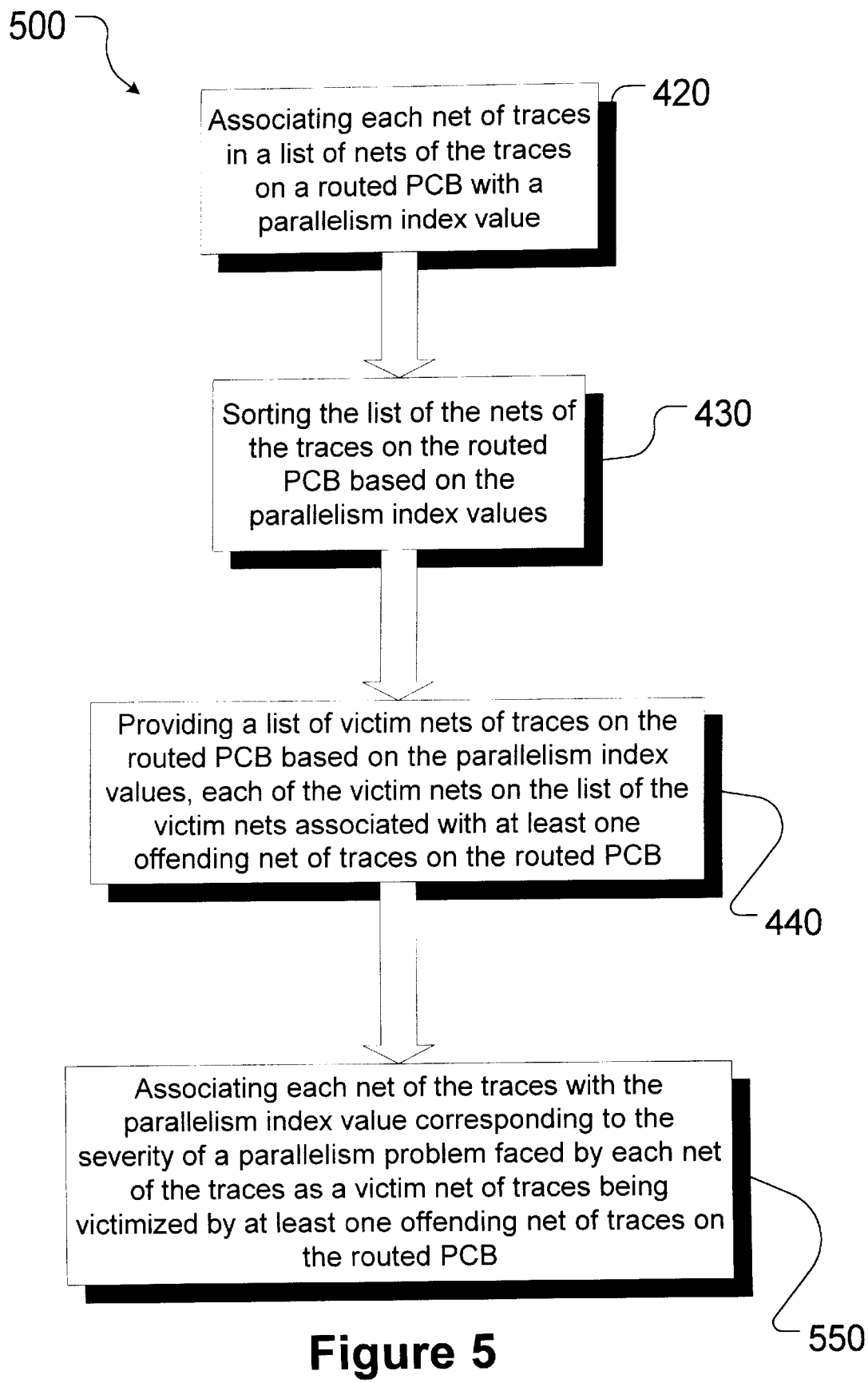

As shown in FIG. 5, the method 500 begins, as set forth in box 420, by associating each net of the traces 130 in the list 120 of the nets of the traces 130 on the routed PCB 110 with a parallelism index (||-ism index) i 140 value. The method 500 proceeds, as set forth in box 430, by sorting the list 120 of the nets of the traces 130 on the routed PCB 110 based on the parallelism index (||-ism index) i 140 values. The method 500 then proceeds, as set forth in box 440, by providing the list of the victim nets of the traces 150 on the routed PCB 110 based on the parallelism index (||-ism index) i 140 values. Each of the victim nets on the list of the victim nets of the traces 150 is associated with at least one offending net of traces 160 and/or 170 on the routed PCB 110. The method 500 then proceeds, as set forth in box 550, by associating each net of the traces 130 with the parallelism index (||-ism index) i 140 value corresponding to the severity of a parallelism problem faced by each net of the traces 130 as a victim net of traces 150 being victimized by at least one offending net of traces 160 and/or 170 on the routed PCB 110. In various illustrative embodiments, sorting the list of the nets of the traces 130 on the routed PCB 110 based on the parallelism index (∥-ism index) i 140 values comprises sorting the list of the nets of the traces 130 in decreasing order of the severity of the parallelism problem faced by each net of the traces 130 on the routed PCB 110.

Figure 6:
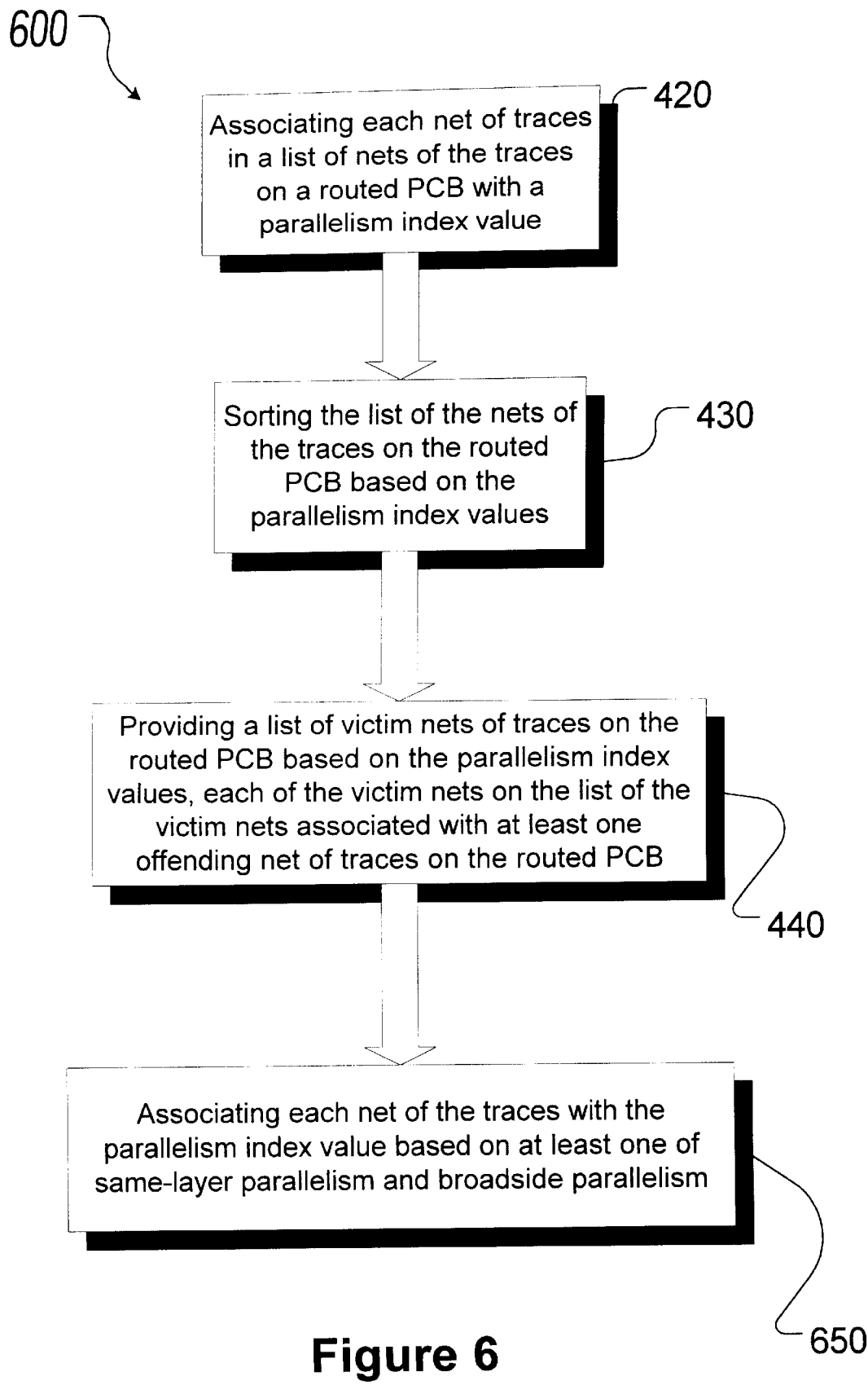

As shown in FIG. 6, the method 600 begins, as set forth in box 420, by associating each net of the traces 130 in the list 120 of the nets of the traces 130 on the routed PCB 110 with a parallelism index (∥-ism index) i 140 value. The method 600 proceeds, as set forth in box 430, by sorting the list 120 of the nets of the traces 130 on the routed PCB 110 based on the parallelism index (∥-ism index) i 140 values. The method 600 then proceeds, as set forth in box 440, by providing the list of the victim nets of the traces 150 on the routed PCB 110 based on the parallelism index (∥-ism index) i 140 values. Each of the victim nets on the list of the victim nets of the traces 150 is associated with at least one offending net of traces 160 and/or 170 on the routed PCB 110. The method 600 then proceeds, as set forth in box 650, by associating each net of the traces 130 with the parallelism index (∥-ism index) i 140 value based on same-layer parallelism and/or broadside parallelism, as described above.

Figure 7:
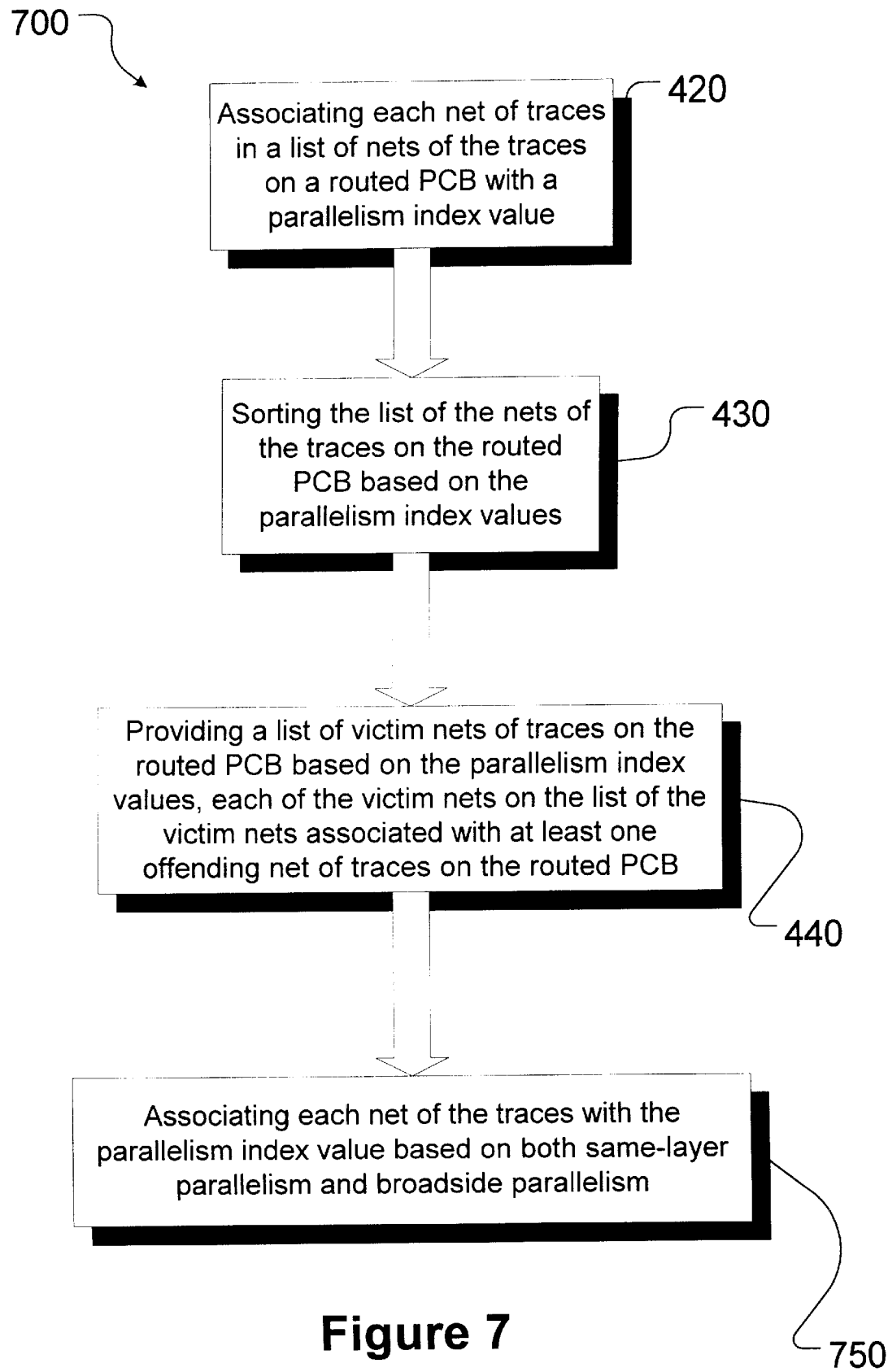

As shown in FIG. 7, the method 700 begins, as set forth in box 420, by associating each net of the traces 130 in the list 120 of the nets of the traces 130 on the routed PCB 110 with a parallelism index (∥-ism index) i 140 value. The method 700 proceeds, as set forth in box 430, by sorting the list 120 of the nets of the traces 130 on the routed PCB 110 based on the parallelism index (∥-ism index) i 140 values. The method 700 then proceeds, as set forth in box 440, by providing the list of the victim nets of the traces 150 on the routed PCB 110 based on the parallelism index (∥-ism index) i 140 values. Each of the victim nets on the list of the victim nets of the traces 150 is associated with at least one offending net of traces 160 and/or 170 on the routed PCB 110. The method 700 then proceeds, as set forth in box 750, by associating each net of the traces 130 with the parallelism index (∥-ism index) i 140 value based on both same-layer parallelism and broadside parallelism, as described above.

Figure 8:
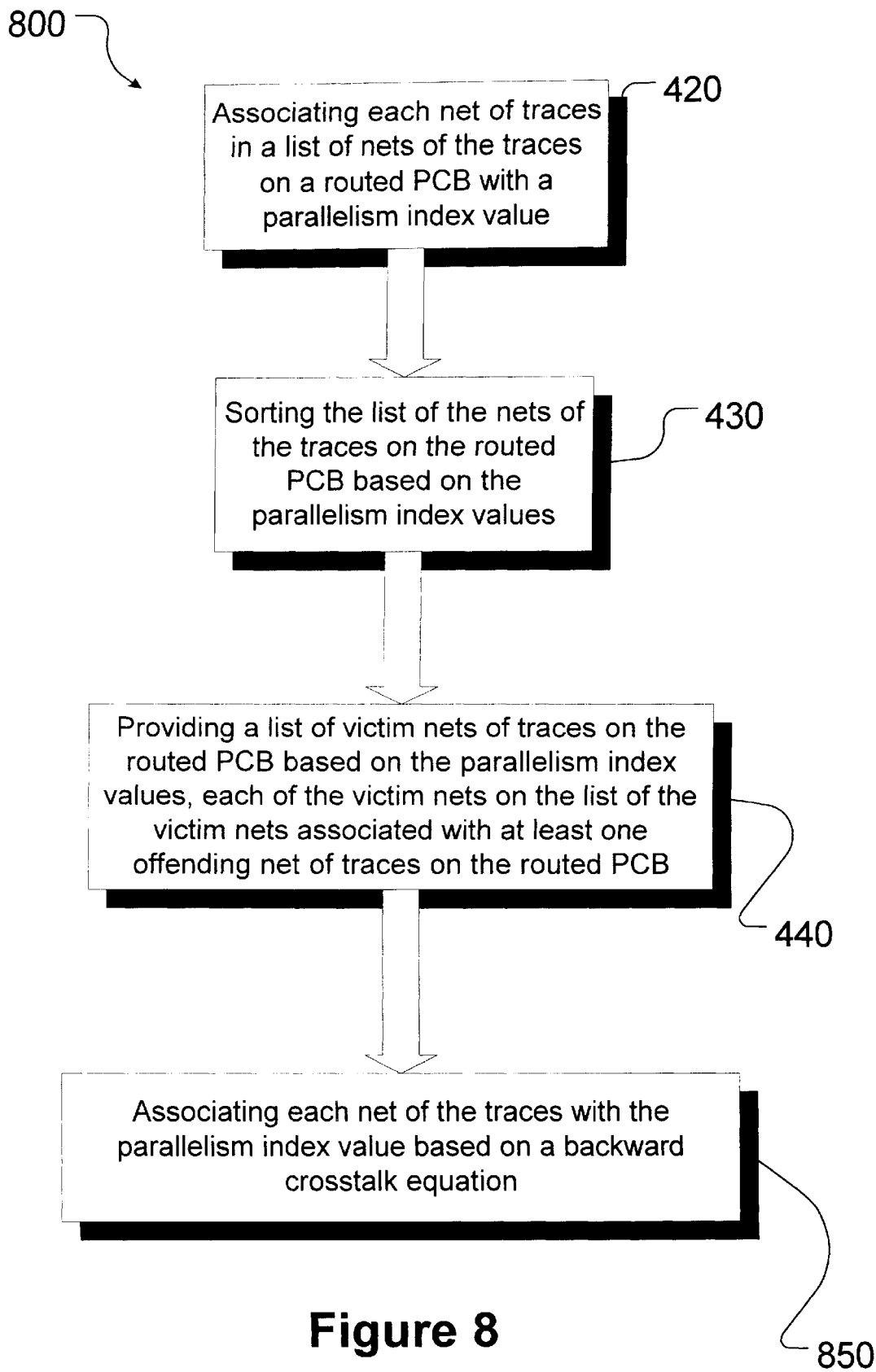

As shown in FIG. 8, the method 800 begins, as set forth in box 420, by associating each net of the traces 130 in the list 120 of the nets of the traces 130 on the routed PCB 110 with a parallelism index (∥-ism index) i 140 value. The method 800 proceeds, as set forth in box 430, by sorting the list 120 of the nets of the traces 130 on the routed PCB 110 based on the parallelism index (∥-ism index) i 140 values. The method 800 then proceeds, as set forth in box 440, by providing the list of the victim nets of the traces 150 on the routed PCB 110 based on the parallelism index (∥-ism index) i 140 values. Each of the victim nets on the list of the victim nets of the traces 150 is associated with at least one offending net of traces 160 and/or 170 on the routed PCB 110. The method 800 then proceeds, as set forth in box 850, by associating each net of the traces 130 with the parallelism index (∥-ism index) i 140 value based on a backward crosstalk equation.

In various illustrative embodiments, a method and a device for parallelism and crosstalk checking according to the present invention may associate each net of the traces 130 from a routed Allegro® board file (.brd) with a parallelism index (∥-ism index) i 140 value corresponding to the severity of the parallelism problem, viewing each net of the traces 130 as a victim net of traces 150. Such a parallelism and check may comprise both same-layer parallelism and broadside parallelism, as described above. By way of contrast, conventional versions of Allegro® do not capture data indicative of broadside parallelism.

In these various illustrative embodiments, the parallelism and crosstalk checking according to the present invention may sort the list 120 of the nets of the traces 130 in decreasing order of the severity of the parallelism problem. The parallelism and crosstalk checking according to the present invention may provide, in a separate file, the offending nets of the traces 160 and/or 170 associated with each victim net of the traces 150 to allow the designer to start with the worst-case offending nets of the traces 160 and/or 170.

In various illustrative embodiments according to the present invention, the backward crosstalk equation may be used. If $L_{parallel} > L_{saturated}$, then the backward crosstalk is saturated. Here $L_{parallel}$ is the actual parallel length of the trace $$L_{saturated} = \frac{t_{rise}}{2t_{propagation\ delay}},$$

$t_{rise}$ is the rise time of the offending logic and $t_{propagation\ delay}$ is the signal propagation delay of the trace per unit length. When $L_{parallel} > L_{saturated}$, and the backward crosstalk is saturated, then $$V_{noise} = V_{noise}^{saturated} = K_{backward\ crosstalk} V_{swing},$$

where $V_{noise}$ is the crosstalk noise voltage, $$V_{noise}^{saturated}$$

is the saturated crosstalk noise voltage, $K_{backward\ crosswalk}$ is the backward crosstalk coefficient and $V_{swing}$ is the voltage swing of the offending net of the traces 160 or 170.

If $L_{parallel} \leq L_{saturated}$, then the backward crosstalk is not saturated. In this case, $$V_{noise} = K_{backward\ crosstalk} V_{swing} \frac{L_{parallel}}{L_{saturated}} = V_{noise}^{saturated}\left(\frac{L_{parallel}}{L_{saturated}}\right).$$

When the backward crosstalk is not saturated, the crosstalk noise voltage $V_{noise}$ is proportional to the length of the traces $L_{parallel}$ running parallel to the victim net of the traces 150, as long as the coupled length $L_{parallel}$, of the traces running parallel to the victim net of the traces 150 is less than or equal to $$L_{saturated} = \frac{t_{rise}}{2t_{propagation\ delay}},$$

where again $t_{rise}$ is the rise time of the offending logic and $t_{propagation\ delay}$ is the signal propagation delay of the trace per unit length, as described, for example at pages 82–89 of the MECL System Handbook.

Note that only backward crosstalk is considered. The forward crosstalk is ignored, since the forward crosstalk is small for most stripline transmission line structures of interest. Note also that the crosstalk noise is proportional to the length of the traces running parallel to the victim net of the traces 150 as long as coupled length $L_{parallel}$ is less than $$L_{saturated} = \frac{t_{rise}}{2t_{propagation\ delay}}.$$

The crosstalk noise is also a function of the spacing between the offending nets of the traces 160 and/or 170 and the victim net of the traces 150. The spacing between two traces may be defined as the center-to-center spacing (or pitch) between the two traces, as described above.

In various illustrative embodiments according to the present invention, the effective parallel lengths are weighted according to the spacing between the nets. The "weight" table is specified for each routed printed circuit board (PCB) since each stackup on the respective routed PCB may be different, requiring a different weight table.

In various illustrative embodiments according to the present invention, the effective parallel lengths are scaled (multiplied) based on the relative voltage swing of the offending and victim nets of traces. For example, an LVTTL to DTL will be scaled up by 2.0 since LVTTL will have twice as a big a voltage swing as the DTL. Note that the effective parallel length may saturate (as in the backward crosstalk case described above) when reaching a fixed length based on the input/output (I/O) technology involved, as described above.

In various illustrative embodiments according to the present invention, the worst-case parallelism length for a victim net of traces 150 is a summation of the all the effective parallel lengths. In these various illustrative embodiments, the statistical worst-case parallelism length for a victim net is a square root of a sum of the squares (root-sum-square or RSS) of all the effective lengths.

As shown in FIG. 3, to give a simplified illustrative example, the spacings $s_1$ and $s_2$ between traces 300 and 310 may be taken to be 1 mil (0.00254 cm) and 2 mil (0.00508 cm), respectively. Similarly, the spacings $s_3$ and $s_4$ between traces 320 and 330, may also be taken to be 1 mil (0.00254 cm) and 2 mil (0.00508 cm), respectively, the spacing $s_5$ between the traces 310 and 320 may be taken to be 3 mil (0.00762 cm) and the respective voltage swing scaling factors may all be taken to be unity. The effective parallel length $$L_{parallel\ 12}^{effective}$$

between the traces 300 and 310, weighted relative to the spacing $s_1$, may be given by $$L_{parallel\ 12}^{effective} = \frac{L_1}{s_1/s_1} + 2\frac{L_2}{s_2/s_1} = \frac{L_1}{1} + 2\frac{L_2}{2} = L_1 + L_2.$$

Similarly, the effective parallel length $$L_{parallel\ 34}^{effective}$$

between the traces 320 and 330, weighted relative to the spacing $s_1$, may be given by $$L_{parallel\ 34}^{effective} = \frac{L_3}{s_3/s_1} + 2\frac{L_4}{s_4/s_1} = \frac{L_3}{1} + 2\frac{L_4}{2} = L_3 + L_4.$$

Likewise, the effective parallel length $$L_{parallel\ 5}^{effective}$$

between the traces 310 and 320, weighted relative to the spacing $s_1$, may be given by $$L_{parallel\ 5}^{effective} = \frac{L_5}{s_5/s_1} = \frac{L_5}{3}.$$

The effective parallel length $$L_{parallel\ 54}^{effective}$$

between the traces 310 and 330, similarly weighted relative to the spacing $s_1$, may be given by $$L_{parallel\ 54}^{effective} = \frac{L_3}{(s_3+s_5)/s_1} + 2\frac{L_4}{(s_4+s_5)/s_1} = \frac{L_3}{4} + 2\frac{L_4}{5}.$$

The worst-case parallelism length $$L_{parallel}^{worst-case}$$

for the trace 310 as a victim net being victimized by the traces 300, 320 and 330 as offending nets may be given by the sum of the respective effective parallel lengths:

$$L_{parallel}^{worst-case} = L_{parallel\ 12}^{effective} + L_{parallel\ 5}^{effective} + L_{parallel\ 54}^{effective}.$$

In various illustrative embodiments, a suitable definition of the parallelism index (‖-ism index) i 140 value $$I_{parallelism\ index}^{worst-case}$$

for the trace 310 may be given by the ratio of the worst-case parallelism length $$L_{parallel}^{worst-case}$$

for the trace 310 to the spacing $$s_1 : I_{parallelism\ index}^{worst-case} = L_{parallel}^{worst-case}/s_1.$$

With such a definition, as the spacing between the respective nets of traces increases, the severity of the parallelism problem would decrease, as indicated by the decrease in such a parallelism index (‖ism index) i 140 value $$I_{parallelism\ index}^{worst-case}.$$

Conversely, as the spacing between the respective nets of traces decreases, the severity of the parallelism problem would increase, as indicated by the increase in the parallelism index (‖-ism index) i 140 value $I_{parallelism\ index}^{worst-case}.$ Similarly, as the worst-case parallelism length $$L_{parallel}^{worst-case}$$

for the respective net of traces increases (decreases), the severity of the parallelism problem would increase (decrease), as indicated by the increase (decrease) in the parallelism index (‖-ism index) i 140 value $$I_{parallelism\ index}^{worst-case}.$$

Similarly, the statistical worst-case parallelism length $$L_{parallel}^{statistical\ worst-case}$$

for the trace 310 as the victim net being victimized by the traces 300, 320 and 330 as the offending nets may be given by the root-sum-square of the respective effective parallel lengths:

$$L_{parallel}^{statistical\ worst-case} = \sqrt{\left(L_{parallel12}^{effective}\right)^2 + \left(L_{parallel5}^{effective}\right)^2 + \left(L_{parallelS4}^{effective}\right)^2}.$$

In various alternative illustrative embodiments, an alternative suitable definition of the parallelism index (‖-ism index) i 140 value $$I_{parallelism\ index}^{statistical\ worst-case}$$

for the trace 310 may be given by the ratio of the statistical worst-case parallelism length $$L_{parallel}^{statistical\ worst-case}$$

for the trace 310 to the spacing $$s_1 : I_{parallelism\ index}^{statistical\ worst-case} = L_{parallel}^{statistical\ worst-case}/s_1.$$

With such a definition, as with the previously described definition, as the spacing between the respective nets of traces increases, the severity of the parallelism problem would decrease, as indicated by the decrease in such a parallelism index (‖-ism index) i 140 value $$I_{parallelism\ index}^{statistical\ worst-case}.$$

Conversely, as with the previously described definition, as the spacing between the respective nets of traces decreases, the severity of the parallelism problem would increase, as indicated by the increase in the parallelism index (‖-ism index) i 140 value $$I_{parallelism\ index}^{statistical\ worst-case}.$$

Similarly, as the worst-case parallelism length $$L_{parallel}^{statistical\ worst-case}$$

for the respective net of traces increases (decreases), the severity of the parallelism problem would increase (decrease), as indicated by the increase (decrease) in the parallelism index (‖-ism index) i 140 value $$I_{parallelism\ index}^{statistical\ worst-case}.$$

In various other alternative embodiments, other suitable definitions of the parallelism index (‖-ism index) i 140 value $I_{parallelism\ index}$ for the trace 310 may be given.

In various illustrative embodiments according to the present invention, the parallelism weight may be derived as follows. A baseline crosstalk level may be picked, such as about 10%. The center-to-center spacing of the traces with approximately 10% crosstalk may be determined. That particular center-to-center spacing may be used as an index of 1.0. For example, for the system shown in FIG. 2 of the traces 230 and 240 disposed between the plane n 200 and the plane n+1 210, in the case where the distance $d_1$ between the plane n 200 and the plane n+1 210 is about 13 mil (0.03302 cm), the distance $d_2$ between the traces 230 and 240 and the plane n+1 210 is about 4 mil (0.01016 cm), the width w of each of the traces 230 and 240 is about 4 mil (0.01016 cm) and the center-to-center spacing s is about 6 mil (0.01524 cm), which is known as a 4 mil–6 mil–4 mil conductor system, the backward crosstalk is calculated to be roughly about 10%.

The relative backward crosstalk coefficient $$K_{backward\ crosstalk}^{relative}$$

for all possible spacings may be calculated from broadside parallelism of 1 mil (0.00254 cm) all the way to the desired maximum spacing, normally around 20 mils (0.0508 cm). All the backward crosstalk coefficients $K_{backward\ crosstalk}$ may be normalized against the center-to-center spacing s that corresponds to the 10% crosstalk case with an index of 1.0, as described above.

The voltage swing scale factor may be specified as follows. The voltage swing scale factor takes in account the relative voltage swing of the offending net(s) of traces as compared to the respective victim net(s) of traces. For example, an LVTTL to DTL will be scaled up by 2.0 since LVTTL will have twice as a big a voltage swing as the DTL. This may be done for all combinations of the input/output (I/O) technology. Additionally, a SPICE simulation may be done to justify the scale factors because there may be subtleties such as a termination or terminations or a lack thereof that might affect the voltage swing. This also implies that an input/output (I/O) technology type may be attached with each net of traces 130. The net name may also have a key prefix and suffix to identify the input/output (I/O) type.

Any of the above-disclosed embodiments of a method and a device according to the present invention enables a printed circuit board (PCB) designer an easy way to verify, after a PCB has been routed, that the routed PCB has been routed according to specified parallelism guidelines. The PCB designer does not need to eyeball the nets of traces on the routed PCB one layer at a time. Any of the above-disclosed embodiments of a method and a device according to the present invention enables quantification of the severity of the parallelism problem(s) automatically identified for the problem nets of traces. With such a method to quantify the severity of the parallelism problem, even given a net count of thousands or so, the PCB designer knows where to begin to fix the problem nets of traces. Additionally, any of the above-disclosed embodiments of a method of manufacturing according to the present invention enables device fabrication with increased device accuracy and precision, increased efficiency and increased device yield, enabling a streamlined and simplified process flow, thereby decreasing the complexity and lowering the costs of the manufacturing process and further increasing throughput.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

What is claimed:

1. A method comprising:
    associating each net of traces in a list of nets of the traces on a routed PCB with a parallelism index value;
    sorting the list of the nets of the traces on the routed PCB based on the parallelism index values; and
    providing a list of victim nets of traces on the routed PCB based on the parallelism index values, each of the victim nets on the list of the victim nets associated with at least one offending net of traces on the routed PCB.

2. The method of claim 1, wherein associating each net of the traces in the list of the nets of the traces on the routed PCB with the parallelism index value comprises associating each net of the traces with the parallelism index value corresponding to the severity of a parallelism problem faced by each net of the traces as a victim net of traces being victimized by at least one offending net of traces on the routed PCB.

3. The method of claim 2, wherein sorting the list of the nets of the traces on the routed PCB based on the parallelism index values comprises sorting the list of the nets of the traces in decreasing order of the severity of the parallelism problem faced by each net of the traces on the routed PCB.

4. The method of claim 1, wherein associating each net of the traces in the list of the nets of the traces on the routed PCB with the parallelism index value comprises associating each net of the traces with the parallelism index value based on at least one of same-layer parallelism and broadside parallelism.

5. The method of claim 1, wherein associating each net of the traces in the list of the nets of the traces on the routed PCB with the parallelism index value comprises associating each net of the traces with the parallelism index value based on both same-layer parallelism and broadside parallelism.

6. The method of claim 1, wherein associating each net of the traces in the list of the nets of the traces on the routed PCB with the parallelism index value comprises associating each net of the traces with the parallelism index value based on a backward crosstalk equation.

7. The method of claim 2, wherein associating each net of the traces in the list of the nets of the traces on the routed PCB with the parallelism index value comprises associating each net of the traces with the parallelism index value based on a backward crosstalk equation.

8. The method of claim 3, wherein associating each net of the traces in the list of the nets of the traces on the routed PCB with the parallelism index value comprises associating each net of the traces with the parallelism index value based on a backward crosstalk equation.

9. The method of claim 4, wherein associating each net of the traces in the list of the nets of the traces on the routed PCB with the parallelism index value comprises associating each net of the traces with the parallelism index value based on a backward crosstalk equation.

10. The method of claim 5, wherein associating each net of the traces in the list of the nets of the traces on the routed PCB with the parallelism index value comprises associating each net of the traces with the parallelism index value based on a backward crosstalk equation.

11. A system comprising:
    a representation of a routed PCB having a plurality of nets of traces thereon;
    a list of nets of the traces on the representation of the routed PCB with a parallelism index value associated with each net of the traces in the list of the nets of the traces on the representation of the routed PCB, the list of the nets of the traces on the representation of the routed PCB sorted based on the parallelism index values; and
    a list of victim nets of traces on the representation of the routed PCB provided based on the parallelism index values, each of the victim nets on the list of the victim nets associated with at least one offending net of traces on the representation of the routed PCB.

12. The system of claim 11, wherein each net of the traces in the list of the nets of the traces on the representation of the routed PCB is associated with the parallelism index value corresponding to the severity of a parallelism problem faced by each net of the traces as a victim net of traces being victimized by at least one offending net of traces on the representation of the routed PCB.

13. The system of claim 12, wherein the list of the nets of the traces on the representation of the routed PCB is sorted in decreasing order of the severity of the parallelism problem faced by each net of the traces on the representation of the routed PCB.

14. The system of claim 11, wherein each net of the traces in the list of the nets of the traces on the representation of the routed PCB is associated with the parallelism index value based on at least one of same-layer parallelism and broadside parallelism.

15. The system of claim 11, wherein each net of the traces in the list of the nets of the traces on the representation of the routed PCB is associated with the parallelism index value based on both same-layer parallelism and broadside parallelism.

16. The system of claim 11 wherein each net of the traces in the list of the nets of the traces on the representation of the routed PCB is associated with the parallelism index value based on a backward crosstalk equation.

17. The system of claim 12, wherein each net of the traces in the list of the nets of the traces on the representation of the routed PCB is associated with the parallelism index value based on a backward crosstalk equation.

18. The system of claim 13, wherein each net of the traces in the list of the nets of the traces on the representation of the routed PCB is associated with the parallelism index value based on a backward crosstalk equation.

19. The system of claim 14, wherein each net of the traces in the list of the nets of the traces on the representation of the routed PCB is associated with the parallelism index value based on a backward crosstalk equation.

20. The system of claim 15, wherein each net of the traces in the list of the nets of the traces on the representation of the routed PCB is associated with the parallelism index value based on a backward crosstalk equation.

21. A device comprising:
means for associating each net of traces in a list of nets of the traces on a routed PCB with a parallelism index value;
means for sorting the list of the nets of the traces on the routed PCB based on the parallelism index values; and
means for providing a list of victim nets of traces on the routed PCB based on the parallelism index values, each of the victim nets on the list of the victim nets associated with at least one offending net of traces on the routed PCB.

22. The device of claim 21, wherein the means for associating each net of the traces in the list of the nets of the traces on the routed PCB with the parallelism index value comprises means for associating each net of the traces with the parallelism index value corresponding to the severity of a parallelism problem faced by each net of the traces as a victim net of traces being victimized by at least one offending net of traces on the routed PCB.

23. The device of claim 22, wherein the means for sorting the list of the nets of the traces on the routed PCB based on the parallelism index values comprises means for sorting the list of the nets of the traces in decreasing order of the severity of the parallelism problem faced by each net of the traces on the routed PCB.

24. The device of claim 21, wherein the means for associating each net of the traces in the list of the nets of the traces on the routed PCB with the parallelism index value comprises means for associating each net of the traces with the parallelism index value based on at least one of same-layer parallelism and broadside parallelism.

25. The device of claim 21, wherein the means for associating each net of the traces in the list of the nets of the traces on the routed PCB with the parallelism index value comprises means for associating each net of the traces with the parallelism index value based on both same-layer parallelism and broadside parallelism.

26. The device of claim 21, wherein the means for associating each net of the traces in the list of the nets of the traces on the routed PCB with the parallelism index value comprises means for associating each net of the traces with the parallelism index value based on a backward crosstalk equation.

27. The device of claim 22, wherein the means for associating each net of the traces in the list of the nets of the traces on the routed PCB with the parallelism index value comprises means for associating each net of the traces with the parallelism index value based on a backward crosstalk equation.

28. The device of claim 23, wherein the means for associating each net of the traces in the list of the nets of the traces on the routed PCB with the parallelism index value comprises means for associating each net of the traces with the parallelism index value based on a backward crosstalk equation.

29. The device of claim 24, wherein the means for associating each net of the traces in the list of the nets of the traces on the routed PCB with the parallelism index value comprises means for associating each net of the traces with the parallelism index value based on a backward crosstalk equation.

30. The device of claim 25, wherein the means for associating each net of the traces in the list of the nets of the traces on the routed PCB with the parallelism index value comprises means for associating each net of the traces with the parallelism index value based on a backward crosstalk equation.

\* \* \* \* \*